United States Patent Office 3,227,633
Patented Jan. 4, 1966

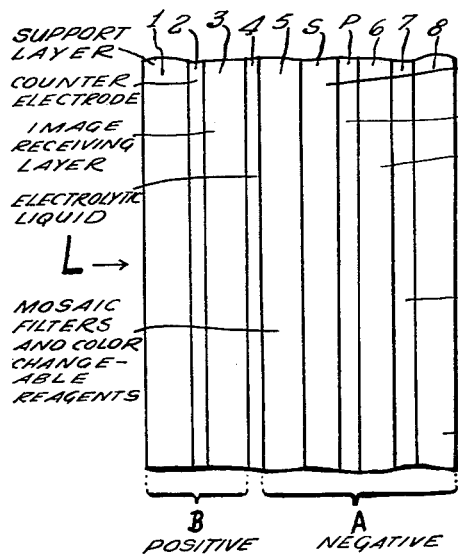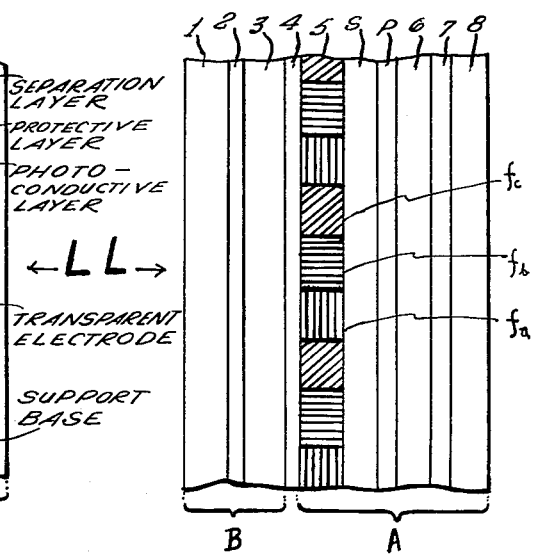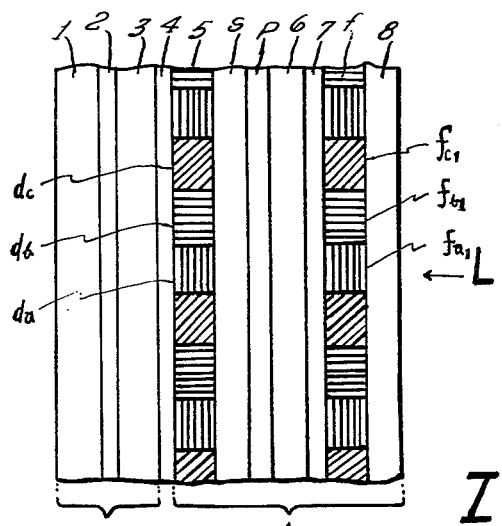

3,227,633
ELECTROLYTIC PHOTOGRAPHIC PROCESS AND ITS MATERIAL
Shin-Ichi Tokumoto, Tokyo, and Eiji Tanaka, Kanagawa-ken, Japan, assignors to Sony Corporation, Tokyo, Japan, a corporation of Japan
Filed June 30, 1961, Ser. No. 134,794
Claims priority, application Japan, July 5, 1960, 35/30,043
11 Claims. (Cl. 204—2)

The present invention relates to a photographic process wherein an image of a subject matter is formed by application of electric current to an image-forming film unit, and photographic material for use with said process.

It is the principal object of the present invention to provide an electrolytic photographic process and photographic material for use with the process whereby application of a very small quantity of electricity makes it possible to obtain a picture with sufficient density; in other words, it is made posible to use such electrodytic photographic material that is highly sensitive and is capable of being handled in light. Another object of the present invention is to directly produce a multicolor picture in a single step without use of separation images. Still another object of the present invention is to produce a picture film making use of the transfer process. These and other objects of the present invention will be apparent from the following description.

The photographic process of the present invention is such an electrolytic photographic process as can be adapted for use in the electrolytic photography wherein an image is formed by exposure to the light and application of electric curent, or in the electric recording apparatus, such as telautograph, wherein an image record is made by application of electric current. Electric current in a quantity corresponding to the color and luminosity of each unit area of a subject matter is applied to each unit area of the image-forming film unit so as to produce or reduce in the image-forming film unit the initiators which serve accomplishment or promotion of the chemical reaction necessary to form an image; thereby the quantity of the said substances in each unit area of the image-forming film unit is differentiated according to the color and luminosity of each unit area of the subject, so as to differentiate in effect the extent of accomplishment or promotion, at each unit area of the image-forming film unit, of the chemical reaction necessary to form an image. This manner of developing an image is characteristic of the electrolytic photographic process of the present invention, and characteristic of the electrolytic photographic material of the present invention is that, when electric current is applied to each unit area of the image-forming film unit in a quantity corresponding to the color and luminosity of each unit area of the subject, the initiators which serve accomplishment or promotion of the chemical reaction necessary to form an image, as a result of said application of current, are brought into being at each unit area of the image-forming film unit in a quantity corresponding to the color and luminosity of each unit area of the subject, so as to accomplish or promote the chemical reaction necessary to form an image to an extent according to the quantity of the initiators thus produced or reduced, and thus an image of the subject can be developed.

In order to enable the invention to be more readily understood, reference is made to the accompanying drawings which illustrate, by way of example, the system embodying the present invention and in which:

FIGURE 1 is an enlarged, cross sectional view of a system embodying the electrolytic photographic process and its photographic material of the present invention;

FIGURE 2 is an enlarged, cross sectional view of another embodiment of the present invention; and FIGURE 3 is of still another embodiment which is easier to manufacture.

In the present invention, what is referred to by application of electric current to each unit area of the image-forming film unit in a quantity corresponding to the color and luminosity of each unit area of the subject is than an electric current is passed through the image-forming film unit in such a manner that, when a photo image of the subject is formed on the image-forming film unit, then there flows through each unit area thereof electric current in a quantity corresponding to the color and luminosity of each unit area of the subject. Since, therefore, this selective application of current, which means that different quantities of electricity should be applied to each unit area of the image-forming film unit, is purported to form an image of the subject, it must be closely related to the color and luminosity of each unit area of the subject. This selective application of current closely related to the color and luminosity of the subject may be controlled either by a photo-conductive layer, photo-voltaic layer, or photo-rectifying layer positioned in parallel with the image-forming film, or it may be controlled as is the case with telautograph by counter-positioned electrodes scanning over the surfaces of the image-forming film.

The above mentioned photo-conductive layer comprises such substances as, for example, photo-sensitive cadmium sulfide, zinc selenide, antimony tri-sulfide or amoprhous selenium. The photo-voltaic layer or photo-rectifying layer comprises such complexes as of selenium and metal foil. Also, such complexes, like photo-transistor, as composed of hetergeneous semi-conductors may be used as controlled to the same effect.

Such complexes as mentioned above function as a photo-voltaic layer, or otherwise, being connected with an outside source of electricity in such a manner as they, unexposed, should resist voltage of the said source and check the flow of current, but should release it only when exposed, they function as a photo-rectifying layer. A layer of such composite material is generally low in its horizontal or sheetwise electric resistance. In this case, the material must be divided into a great number of points electrically insulated from one another and be arranged on the surface of a base.

The current to be applied to the image-forming film unit might as well be an alternating current as a direct one directed in a definite direction. In case of an alternating current, the current-caused reaction whereby the initiators which serve accomplishment or promotion of the chemical reaction necessary to form an image are produced or reduced in the image-forming film unit needs to be not completely reversible. Examples of this reaction will be introduced in Example 1 described later.

The chemical reaction necessary to form an image is the one whereby it can be observed that substances are so colored, faded, changed in color, or fixed as to form an image in effect. The chemical reactions that may be employed in the formation of the image may involve any of such cases as, for example, the product resulting from the reaction of silver salt, copper salt, mercury salt, or lead salt with a developer has a color and luminosity different from those prior to the reaction; or a product wherein an inorganic or organic compound is converted into a product which has a solubility different from that prior to the conversion.

Following are examples of the initiators that can serve accomplishment or promotion of the said chemical reactions necessary to form an image.

In case, for example, that sodium silver thiosulfate or the like substances that are comparatively irreducible in used alone, it undergoes little chemical reaction that is discernible to the naked eye when it contacts such liquid developer as composed principally of hydroquinone. However, if silver sulfide or lead sulfide or other heavy-metal compounds coexists with it even in a very small quantity, such comparatively irreducible substances as mentioned above can be reducible. Namely, in the case with sodium silver thiosulfate, silver will be made free. If, in this case, there coexists an organic coupler in addition, the developer oxidized upon reducing silver couples with the coupler to produce a colored substance, although a non-reacted developer does not couple with a coupler.

The above mentioned sulfides or heavy-metal compounds are the substances that serve to acomplish or promote the chemical reaction necessary to form an image that will hardly proceed without them; in other words, they represent a catalyzer or an initiator for the image-forming reaction.

Exemplified hereunder is the system to cause such initiator for image-forming reaction to be produced or reduced by application of electric current.

EXAMPLE 1

744 g. sodium thiosulfate is dissolved in 3 liters of water, in which solution 376 g. silver bromide is dissolved completely with stirring, to give a solution of sodium silver thiosulfate. To this solution is added the same quantity of alcohol so as to precipitate the sodium silver thiosulfate thereof. The precipitate thus obtained is washed with alcohol and dried into crystallized sodium silver thiosulfate. 60 g. of this crystal is added to 500 cc. of an aqueous solution of 10% gelatine. This liquid composition is spread, several microns or several tens of microns thick, over such a conductive base as NESA glass which has a thin, transparent and semi-conductive layer principally made of tin oxide on its surface or a layer of platinum, and dried. While this dry coated film is being made suitably wet, and a movable electrode of platinum is being moved with its end contacting the surface of the coated film, current variable according to the image pattern is sent with the movable electrode being made negative. In the present example, the maximum voltage between the electrodes was 7 volts, and the maximum quantity of electricity 1 microamperesecond per square centimeter. The mere application of current caused no apparent change to the surface of the said coated film that could be discerned with the naked eye. However, when electrolysis is conducted in an aqueous solution of sodium silver thiosulfate with a platinum electrode, or when, in the present example, the quantity of electricity is increased, silver sulfide is produced discernibly at the cathode. It is obvious, therefore, that also in the above mentioned case, silver sulfide is produced in such a slight quantity as is indiscernible to the naked eye.

Over the said coated film is spread a developer comprising:

| | |
|---|---|
| Water ___cc__ | 60 |
| Sodium carboxymethyl cellulose ___g__ | 2.5 |
| Sodium sulfite ___g__ | 2.6 |
| Sodium thiosulfate ___g__ | 0.7 |
| Citric acid ___g__ | 1.3 |
| Sodium hydroxide ___g__ | 2.5 |
| Hydroquinone ___g__ | 1.7 |
| 1-phenyl-3-pyrazolidone ___g__ | 0.03 |

In several seconds after the developer is spread, there appears a black image pattern corresponding to the quantities of electricity applied.

In case that the coated film used in the above example be utilized, especially, together with a photo-conductive layer or photo-voltaic or photo-rectifying layer (to be mentioned later) to control the quantities of electricity to be applied, it is preferable for application of current that the developer be positioned between the said coated film and such said layer without contact with the air.

In the above example, if it is desired to obtain a colored image, as is to be illustrated with drawings, one method thereof is to utilize a developer comprising water-soluble salt containing such substances suitable to obtain desired colors as diethyl paramine, dimethyl paramine, or 2-amino-5-diethyl-amino-toluene, these developer components being oxidized upon reducing silver so as to couple with such couplers as acetoaceta-2-chloro-anilide for yellow, paranitro phenyl acetonitrile for magenta, and 2.4 dichloro-1-naphthol for cyan.

In order to preserve the image that is created on the image-forming film in the above mentioned manner, a preservable image can be obtained when, of the image-forming components including silver and dyes, those or part unnecessary or excessive to form an image are washed away. And the image obtained in any of the cases in the present example can be transferred to another image-receiving layer by the usual transfer process of photography.

Mentioned above is an example of the case that initiators for image-forming reaction are produced by application of electric current. The following is of the case that such initiators are reduced by application of current:

Example 2

A conductive NESA glass (hereinbefore set forth) is coated very thinly and uniformly with silver by evaporation, and this is covered with a protective layer of polyvinyl alcohol which is completely saponified and therefore insoluble to cold water. This layer unit being kept in contact with an aqueous solution of 20% sodium nitrate, electric current is applied thereto in a manner similar to that shown in Example 1.

Then, the layer unit is adequately washed with water, and after the washing, its protective layer surface is covered with a gelatine film containing sodium silver thiosulfate such as shown in Example 1. Then to this gelatine film is applied the developer exemplified in Example 1, and seconds later, the areas where current did not pass turn black. The greater the quantity of electricity applied, the less the extent of blackening because silver, an initiator for image-forming reaction is converted into silver nitrate and washed away. Thus, a desired image is obtained.

Unless transfer based on this image obtained is desired, unnecessary or excessive components other than those necessary for the formation of the image will be washed away from the said layer unit; if desired, the image can be transferred to another image-receiving layer by means of the usual transfer process of photography.

So far, the present invention has been explained centering around the system of producing or reducing initiators for image-forming reaction by application of electric current. Agent substances of image-forming reaction are not limited to the above mentioned silver salt, nor substances to initiate the reaction, to the above mentioned substances. For example: a product obtained through abrupt oxidization of a mixture of 100 g. tin chloride, 1 g. antimony chloride, 10 cc. of 35% hydrochloric acid, 1 g. ammonium fluoride and 100 cc. water being sprayed over a glass board heated over 600° C. is, though electrically conductive, ineffective as initiator for image-forming reaction. However, a product obtained by reducing the said product by electrolysis is a highly effective initiator for image-forming reaction. As agent substances of image-forming reaction, organic compounds as well as inorganic compounds of metal can be used: particularly, for example, a metallic compound of pyrazole, triazole, imidazole, thiazole or thiazolidine, and the derivatives of such compounds.

However is is preferable that the initiators for image-forming reaction be of heavy metal or semi-conductive material in themselves, or else of heavy metal or semi-conductive material obtained by application of current. Also it is preferable to have the initiators in a form of galaxy, for it is thereby made easier to form half tone, especially in case that the transfer process is employed in making a picture.

In case of coloring reaction by reduced silver as is the case with Example 1, in order to make it easier for reduced silver produced by image-forming reaction to grow into a size large enough to easily absorb visible rays, and in order therefore to provide beforehand in the colloid enough room for the reduced silver to grow in, it is desirable that the agent substances of image-forming reaction, such as above mentioned sodium silver thiosulfate, be dispersed in the gel colloid in a crystal form of the said size and that the said initiators be produced by application of current as part of, or adjacent to, the space occupied by the crystals.

To make it more effective, the above exemplified pulverized sodium silver thiosulfate or the like agent substances of image-forming reaction attached to silica aerogel, more than 10% of any one of these is dispersed in oil-soluble resins, such as polyvinylbutyral, and spread in a thin film and dried. This thin film, being permeable to ions, is capable of having initiators for image-forming reaction produced in the said space. Incidentally, if to the above mentioned silica aerogel or the like, hydrophilic resin such as polyvinyl pyrolidone, polyvinyl-methyl ether or the like, or hydrophilic colloid such as gelatine, sodium carboxymethyl cellulose or the like, is attached, all the better ion-permeability can be acquired. In the above examples, again, the agent substances of image-forming reaction were contained beforehand in the image-forming film, but it goes without saying that they do not necessarily have to be contained in the image-forming film beforehand, but can be added or applied thereto at any suitable time in the course of the image-forming process.

For convenience sake in illustrating the accompanying drawings, the photo-conductive layer, photo-voltaic layer, or photo-rectifying layer will hereafter be inclusively called "photo-current-passable layer," and the agent substances of image-forming reaction will be called "color-changeable reagents."

Various systems of utilizing the photo-current-passable layer to control the quantities of electricity to be applied are illustrated hereunder with reference to the accompanying drawings:

Of the accompanying drawings, FIGURE 1 is of a system to obtain a mono-colored image, and FIGURE 2 and FIGURE 3 are of systems to obtain a multi-colored image. The symbol L denotes exposing light with its direction of approach indicated by the arrow.

FIGURES 1, 2 and 3 show respectively the photographic material of the present invention consisting of two blocks: Block A comprising an image-forming film unit of layers 5 to 8 combined, and block B a unit of layers 1 to 3 combined. The latter block B is shown in the figures merely to indicate the relative positions to block A of a counterpart electrode 2, transparent or opaque, to be utilized in application of current in the course of the image-forming process, and of an image-receiving layer 3 to be used in transferring the image. Layer 1 represents a base of paper, transparent cellulose derivatives or glass to support the electrode 2 and/or the image-receiving layer 3. Layer 4 represents the layer of electrolytic liquid or transferring liquid to be spread between said blocks A and B at the time of application of current or transferring. Layer 5 represents a layer containing color-changeable reagents such as sodium silver thiosulfate and couplers. Layers S and P will be described later, and layer 6 represents the photo-current-passable layer. Layers 7 and 8 represent respectively the transparent or opaque electrode and the base. In FIGURE 2, the color-changeable reagent layer 5 is divided into fa, fb, fc, and so on, each composed of a mosaically arranged color-separation filter with a color different from one another and a color-changeable reagent to form a color corresponding to the filter. The filters and the color-changeable reagents corresponding to them may form each their own separate layer combined into a unit or may form a state of mixture wherein the dyes for filters and the color-changeable reagents are mixed. However, as is shown in this figure, in case that the filters and color-changeable reagents are positioned on the same side of the photo-current-passable layers 6, it is preferable that the color-changeable reagents be as little colored as not to prevent exposing light from performing color separation and be capable of allowing penetration of the light. In FIGURE 3, the color-changeable reagent layer 5 is divided into a plurality of units da, db, dc, and so on, namely, composed of mosaically-arranged color-changeable reagents to form colors different from one another. Separated from this layer 5 by layers S and P as hereinafter set forth, are the photo-current-passable layer 6 and the transparent electrode 7. There is positioned a filter layer f which is also divided into a plurality of units fa, fb, fc and so on, each composed of mosaically arranged color-separation filters of colors different from one another. The units da, db and dc of the color-changeable reagent layer and filter units fa, fb and fc corresponding to said layers are correlative in color. When color-changeable reagents for two or more colors are arranged mosaically on the support, the quantities of electricity to exert on color-changeable reagents for different colors are required to be different according to the difference of colors. The quantities of current applied to have effect on the mosaically arranged color-changeable reagents must be controlled by the filters of colors each corresponding to each color of the color-changeable reagents of two or more colors. Layer 8 represents a transparent base of glass, cellulose derivatives or the like, to be utilized, if necessary, to support the photo-current-passable layer 6, transparent electrode 7 and filter layer f.

In FIGURES 1, 2 and 3 layer S represents a layer to be required when two or more color-changeable reagents, such as two types of color-changeable reagents like the above mentioned sodium silver thiosulfate and coupler, are used separately in the order of their performing the image-forming reaction; that is, for example, this layer S contains sodium silver thiosulfate, the layer 5 containing couplers.

Layer P represents a protector layer to protect the photo-current-passable layer 6 from the image-forming reaction. It is required that this layer be capable of passing electric current, and besides, that the possible passage of current be made easy layerwise or in the direction vertical to the layer and difficult sheetwise or horizontally. As is shown in FIGURES 1 and 3, in case it is so devised that the exposing light approaches the layer from the side of the photo-current-passable layer, the said layer may well be opaque. In this case, conductive paint containing carbon powder, silver powder and the like conductor of electricity can be used. The vertical or layerwise and horizontal or sheetwise resistance of the layer can be controlled by adjusting the quantity of powder conductor contained in the paint and the thickness of the layer. Conductive paint having an ethoxy resin and containing 13% (in weight) carbon powder has, when formed in a 10-microthick layer, a layerwise resistance of 100 ohm per 1 square centimeter and a sheetwise resistance of 100 megohm square, the embodiment of which has resulted satisfactorily.

Meanwhile, as is shown in FIGURES 1 and 2, in case it is so devised that the exposing light approaches the photo-current-passable layer from the side of the said protector layer P, the layer is required to be transparent.

The inventors of the present invention, intending to employ such protector layer, have invented the following transparent conductive paint and obtained very satisfactory results from employing it. First, 5 g. silica aerogel is dispersed in a mixture of 65 cc. water and 50 cc. alcohol, and then added thereto and mixed adequately therewith is 35 cc. mixture of 100 g. tin chloride 1 g. antimony chloride, 10 cc. 35% of hydrochloride acid, 1 g. ammonium fluoride and 50 cc. water. This mixture is sprayed into a gas flame, and by this heat-treatment is produced transparent powder. This powder is piled 35 microns thick and pressed lightly to have a thickwise resistance of 80 ohm per square centimeter. 10 g. of this powder is dispersed in a toluene solution of 10 g. methyl methacrylate and is so spread in a thin film that the film be 5 microns thick upon drying. Then, after the drying, it is impregnated with paraffin at 60° C. The transparent and conductive protector layer thus obtained has a light-penetration rate of more than 90% and a layerwise resistance of 80 ohm per square centimeter and a sheet-wise resistance of 100 meghom square.

Hereunder explained is the image-receiving layer for the purpose of transferring the image.

In the present invention, when the image is to be transferred, the various known methods of transfer photography can be adapted. It is preferable that those above mentioned color-changeable reagents remaining non-reacted within the image-forming film unit be made to pass through the transfer liquid layer 4 and be reacted on the image receiving layer 3 to form a picture. In the above mentioned case, for instance, that the reaction to reduce silver from silver salt is utilized for image-forming reaction; if the image-receiving layer contains beforehand such initiators for image-forming reaction as following, the image-forming reaction will proceed immediately where color-changeable reagents have reached:

Examples of initiators:

| | |
|---|---|
| Silica aerogel | g__ 15 |
| Water solution of 2% sodium sulfide | cc__ 140 |
| Cadmium acetate | g__ 1.5 |
| Lead acetate | g__ 0.1 |
| Zinc nitrate | g__ 1.5 |

It goes without saying that development on the image-receiving layer can be conducted separately after transfer of color-changeable reagents to the image-receiving layer has been completed.

In order to obtain a colored image, employing the above exemplified color-changeable reagents: if the image-receiving layer has cupric sulfate or the like oxidizing reagents contained therein beforehand, the image-forming reaction will proceed immediately where the color-changeable reagents have reached. Also in this case, the oxidizer and the like reagents may, instead of being contained beforehand in the image-receiving layer, be furnished after the color-changeable reagents have been transferred to the image-receiving layer. Following is an embodiment of the above-mentioned layer containing color changeable reagents suitable to obtain a colored picture:

For example, 0.117 g. 2–4-dichloro-1-naphthol is dissolved in 3 g. triphenyl phosphate, and this is emulsified in 20 cc. gelatine containing sodium silver thiosulfate exemplified in Example 1, using a small quantity of emulsifier such as lauryl sulfate. The magenta coloring reagent and the yellow coloring reagent can both be treated in the same manner.

When color-changeable reagents are employed in such a system as illustrated in FIGURE 3, it is preferable that a printing process be employed to arrange those emulsions mosaically, for it is required that the emulsions and the filters corresponding to them in color be arranged in counter-positions with, at least, the photo-current-passable layer positioned in-between.

To be employed in such a system as is shown in FIGURE 2, the emulsions are required to be dyed in the colors of the filters corresponding to the color-changeable reagents contained in the emulsions. First, these dyed emulsions are diluted with the same quantity of water, heated up to about 40° C., and sprayed into a wind tunnel whereinto is sent heated dry air. Experiments show that this spray, even of such a size as of 50 microns in diameter, becomes a dry spherical particle in the course of the passage of a tunnel about 3 meter long. The smaller the particle is, the faster it dries. Thus obtained are almost transparent spherical particles. One method of arranging the said particles mosaically is that of said emulsion particles are mixed and spread on a surface which is thinly coated beforehand with adhesives, such as gum arabic, gelatine, polyvinyl-methyl ether or the like, and then swept lightly on their spread surface so that they may be spread uniformly, without being overlapped with one another. However, since this manner of spreading is apt to leave many gaps between the particles, this particle layer is pressed on its surface. Continued pressing until the layer is reduced to about ⅔ to ½ in thickness, and most gaps are stopped: a 10-micron-thick particle layer, for example, is pressed to be 5 microns thick.

The particle layer with its gaps thus stopped still has some, though few, gaps remaining unstopped. In order to fill up these remaining gaps so as to prevent the light from permeating therethrough, they are filled with permeating paraffin dyed in black. The reason why such gaps are to be filled up as perfectly as possible is because, if the light penetrates through them, it will send current to the relative areas and diminish the effect of the mosaically arranged color separating filters.

Methods for the production of the photo-current-passable layer are, by way of examples, described as follows:

A mixture consisting of a photo conductive cadmium sulfide powder containing, in molar ratio, copper as an activator in quantities of one-ten thousandth of cadmium sulfide, the simular ethoxy resin as that hereinbefore set forth of an amount of 4% by weight of the said sulfide powder and a diacetone alcohol (solvent) of a suitable amount is uniformly coated on the surface of electrode, for example, NESA glass to make a laminate having a thickness, for example, of about 80μ. When a potential of 100 volts is transversely or layerwisely imposed on the laminate and the laminate is exposed to the light of about 5 foot candles, a photo-current of about 18 milliamperes per square centimeter develops. If the exposure is cut off there is almost no flow of current. Further, in place of the above mentioned photo-conductive cadmium sulfide, a photo-sensitive powder can be utilized which consists, for example, of two kinds of semi-conductive materials as described under, namely photo-sensitive powder produced, for example, by precipitating a cuprous oxide (a semi-conductive material) from an aqueous solution of copper salt added with reducing agent such as grape sugar on the surface of cadmium sulfide powder (another semi-conductive material) containing, in molar ratio, five-ten thousandths of indium and then by heat-treating the thus obtained powder in an atmosphere of an inactive gas at about 550° C. for a very short time. The said powder is mixed with the resin in the same manner as that hereinbefore set forth and the resulting mixture is coated on surface of electrode to make a laminate having a thickness of about 40μ. When a potential is imposed on the said laminate under the same conditions as those described before, a photo-current of about 7 milliamperes/cm.$^2$ develops under the irradiation of about 5 foot-candles, and if the irradiating rays are cut off, only a current of $3 \times 10^{-4}$ of the said current can be obtained.

Moreover, photo-current-passable layer of the following type can cause a practically available current to pass therethrough under a low potential. Namely, the photo-current-passable layer can be produced in the following manner.

A nickel-plate electrode is applied to the surface of network glass plate which has a thicknes of about 0.4 mm. and has regularly been formed on the overall surface thereof with numerous perforations, the said perforations are filled with selenium, the surface thereof is polished and thereafter, the glass plate thus treated is heated at about 200° C. for 4 hours and then cooled slowly. Another network glass plate, which has the same size of perforation in the same position as that of the above mentioned network glass plate, is used as a shadow mask, and cadmium and gold are thinly deposited on only the surfaces of the said selenium particles insulated by the said glass network, by spattering process and vapor deposition process, respectively, and thus, the desired photo-current-passable layer can be obtained.

The photo-sensitivity of the photo-current-passable layer thus produced is shown as follows:

The gold portion of the above mentioned photo-current-passable layer is electrically connected to a copper electrode of an electric cell which comprises electrodes of copper and aluminum and an electrolyte solution of 5% aqueous sodium chloride solution, and the nickel portion of the said photo-current-passable layer is also connected to the aluminum electrode. When the said layer is exposed to the light of 120 foot-candles, photo-current of 0.1 milliamperes/cm.$^2$ can be obtained, and when the exposure is cut off, there is almost no flow of current.

Furthermore, in place of the said copper-sodium chloride solution-aluminum-cell a layer having an electric cell structure, in which metals having a different potential are placed on both sides of color-changeable reagent layer in such a manner that the said metals embrace the reagent layer between them, can preferably be used in combination with the above mentioned photo-current-passable layer.

When it is desired to make a multi-color picture employing the image-forming film unit produced by using the filter layer, the color-changeable reagent layer and photo-current-passable layer as described above, the filter-layer-attached side of the photo-current passable layer is faced to the subject and exposed for application of current. In this case, apart from applying current after exposure, if exposure and application of current are to be conducted at the same time, the electrode standing in the course of light between the subject and the photo-current-passable layer is necessarily required to be transparent. In this respect, if, as is shown in FIGURE 2 (or in FIGURE 1, also) the exposing light L reaches the photo-current-passable layer 6 through the color-changeable reagent layer 5, the electrode 2 in the figures need to be transparent. However, in a variation of the system illustrated in FIGURE 2, where with the color-changeable reagent layer 5 and the electrode 2 combined into a unit, the liquid for electrolysis or development or transferring must be furnished to the color-changeable reagent layer 5 through the electrode, it is preferable to form the electrode by vapor deposition or spattering of metals or of semi-conductive materials, for a thin metallic or semi-conductive film formed by evaporation or spattering is capable of allowing the permeation of liquid as well as of light.

Also it is highly advantageous for the purpose of transferring that the polarity of the electrode 2 be so defined as to have the initiators for image-forming reaction be produced or existing on the electrode 2-attached side of the color-changeable reagent layer 5, for the availability of the initiators will thus be made greater since the agent substances of image-forming reaction, in this case, must pass where the said initiators exist when they move from the color-changeable reagent layer 5 to the image-receiving layer 3. In case where the colors to be formed by color-changeable reagents and the colors of the filters corresponding to the said reagents are made complementary with each other, that is, for example, the filters are made in the three primary colors of the additive system, and the color-changeable reagents of the three primary colors of the substractive system are employed and so arranged that the filter and the reagent in colors complementary with each other be counter-positioned, then a most-faithfully-colored transferred picture can be obtained. Among the particles positioned where red light reaches, only those dyed in red pass the light, by which light only such areas of the photo-current-passable layer as have received the light pass current, and there at the very areas are colored and fixed the coloring reagents of cyan color, the color complementary to red. When such a state has been accomplished, if to the surface where color-changeable reagents exist is attached an image-receiving layer, such as a gelatine layer, comprising the substances that easily absorb non-reacted color-changeable reagents, and if between the said surface and this layer is spread such transfer liquid as capable of solving the said non-reacted color-changeable reagents and diffusing and moving them to the image-receiving layer, the non-reacted color-changeable reagents are transferred to the image-receiving layer.

In the present example, at the areas where red light has reached, particles of cyan color alone remain where they are spread, and those of magneta and yellow are transferred to the image-receiving layer and oxidized there to form red.

Similarly, at such areas of the image-receiving layer as corresponding to the area of the photo-current-passable layer that have received green light, cyan and yellow are transferred thereto to form green. Likewise, where blue light has struck, cyan and magneta are transferred to form blue. And where white light has struck, no color-changeable reagents are transferred and therefore such areas of image-receiving layer remain in the original color of the layer, namely colorless or white. At such areas of the photo-current-passable layer as have not been reached by light, the dyes which are to work by the subtractive system are all transferred to the image-receiving layer so as to form black. In such cases as the black has a low density as it is formed by combined dyes alone, and if it is desired to intensify the black, such image-forming components as silver exemplified in Example 1 or the like that belong to pigment, can be produced on the image-receiving layer together with dyes.

Above described and illustrated with accompanying drawings are the electrolytic photographic process and photographic material for use with the process of the present invention. Incidentally, it is intended that all mater, including substances, their quantities, arrangements of materials, etc., contained in the above description or shown in the accompanying drawings shall be interpreted as illustrative and not limiting. Certain changes may be made in the above product and process without departing from the scope of the invention herein involved. Such technically comprehensible changes, for example, as in the case that two or more types of color-changeable reagents are separately contained in the layers 5 and S as shown in FIGURES 1, 2 and 3, a protector layer or diffusion-controlling layer may be created to be positioned between 5 and S for the purpose of delaying the diffusion time of some of the color-changeable reagents so as to control the time and order for the color-changeable reagents to do the image-forming reaction, shall be included within the scope of the present invention.

What is claimed is:

1. A multicolor picture film comprising: a layer containing color changeable reagents for at least two different colors and initiators for picture forming chemical reaction which are reduced by the application of electric current, said initiators selected from a class consisting of alkali metal sulfides and heavy metal salts, said color changeable reagents being coextensive and arranged in the form of mosaic in a current-passable state without one lying upon another; a mosaic color filter for color separation wherein a color corresponds to that of said color changeable reagent, a protective layer usable as an electrode for an electric current corresponding to an objective image to be reproduced, and means for providing said electric current.

2. A multicolor picture film as defined in claim 1, wherein said color changeable reagents, moisaic color filters, and initiators are contained in said layer.

3. A multicolor picture film as defined in claim 1, wherein said initiator is an alkali metal sulfide.

4. A multicolor picture film as defined in claim 1, wherein said initiator is a heavy metal salt.

5. A multicolor picture film comprising, a layer of transparent supporting film, a mosaic color filter, a second layer usable as an electrode for an electric current corresponding to an objective image to be reproduced, a third layer containing color changeable reagents and initiators therefor which are actuated to form a latent image by the combination of light and an electric current, said initiators being selected from the group consisting of alkali metal sulfides and heavy metal salts, said third layer being upon the receiving layer which contains a counter-electrode with a support film, and a fourth layer of an electrolyte being inserted between said third and receiving layers.

6. In a photographic image forming method consisting essentially of providing, a pair of electrodes lying in generally parallel planes, a photo-current-passable mosaic element lying in a generally parallel plane between the electrode planes and having individual elements of the mosaic that are selective color filters, a layer interposed between the mosaic element and one of said electrodes, said layer containing color forming reagents which are coextensive and initiators therefor which are actuated to form a latent image by the combination of light and electric current, said initiators being selected from the group consisting of alkali metal sulfides and heavy metal salts, means for creating an electric potential across the electrodes, and selectively exposing portions of said mosaic to actinic light and an electric current to create a latent image thereon, subsequently developing said latent image to form a visible color image.

7. A method as defined in claim 6 wherein the initiator is an alkali metal sulfide.

8. A method as defined in claim 6 wherein the initiator is a heavy metal salt.

9. A multicolor picture film as defined in claim 1 wherein the initiator is cadmium acetate.

10. A multicolor picture film as defined in claim 1 wherein said initiator is lead acetate.

11. A multicolor picture film as defined in claim 1 wherein said initiator is zinc nitrate.

References Cited by the Examiner
UNITED STATES PATENTS

| | | | |
|---|---|---|---|
| 2,440,526 | 4/1948 | Solomon | 204—2 |
| 2,968,554 | 4/1961 | Land | 96—3 |
| 2,983,606 | 5/1961 | Rogers | 96—29 |
| 3,010,883 | 11/1961 | Johnson et al. | 204—18 |
| 3,142,562 | 7/1964 | Blake | 204—2 |

JOHN H. MACK, *Primary Examiner.*

JOSEPH REBOLD, WINSTON A. DOUGLAS,
*Examiners.*